United States Patent
Lee et al.

(10) Patent No.: US 6,714,703 B2
(45) Date of Patent: Mar. 30, 2004

(54) OPTICAL COLLIMATOR AND METHOD FOR MAKING SAME

(75) Inventors: Ger-Sheng Lee, Tu-Chen (TW); Tzu-Ho Hsu, Tu-Chen (TW); Chih-Yi Chen, Tu-Chen (TW); Ming-Chiang Tsai, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/095,393

(22) Filed: Mar. 11, 2002

(65) Prior Publication Data

US 2003/0095748 A1 May 22, 2003

(30) Foreign Application Priority Data

Nov. 21, 2001 (TW) ........................... 90220080 U

(51) Int. Cl.⁷ ................................. G02B 6/32
(52) U.S. Cl. ..................... 385/34; 385/33; 385/60; 385/78
(58) Field of Search ..................... 385/15, 24, 27, 385/31, 33, 34, 46–48, 60–61, 78–79, 83

(56) References Cited

U.S. PATENT DOCUMENTS

| | | | | | |
|---|---|---|---|---|---|
| 5,555,330 A | * | 9/1996 | Pan et al. | ........ | 385/39 |
| 5,706,371 A | * | 1/1998 | Pan | ........ | 385/11 |
| 5,734,762 A | * | 3/1998 | Ho et al. | ........ | 385/11 |
| 5,815,614 A | * | 9/1998 | Pan | ........ | 385/22 |
| 6,168,319 B1 | * | 1/2001 | Francis | ........ | 385/79 |
| 6,343,166 B1 | * | 1/2002 | Hellman et al. | ........ | 385/31 |
| 6,353,691 B1 | * | 3/2002 | Li et al. | ........ | 385/11 |
| 6,454,465 B1 | * | 9/2002 | Uschitsky et al. | ........ | 385/79 |
| 2002/0186915 A1 | * | 12/2002 | Yu et al. | ........ | 385/11 |
| 2002/0191881 A1 | * | 12/2002 | Chen et al. | ........ | 385/11 |

* cited by examiner

Primary Examiner—Phan T. H. Palmer
Assistant Examiner—Jennifer Doan
(74) Attorney, Agent, or Firm—Wei Te Chung

(57) ABSTRACT

An optical collimator comprises an optical fiber (210), a ferrule (220), a GRIN lens (230), a metal sleeve (240), and an outer metal tube (250). The optical fiber has an exposed end which is inserted into the ferrule and glued thereinto. The GRIN lens is glued into the sleeve. Opposite ends (232, 234) of the GRIN lens protrude from opposite ends of the sleeve. The outer tube includes first and second receiving portions (252, 254). The ferrule is glued into the first receiving portion, and the sleeve is secured in the second receiving portion. A plurality of soldering holes (256) is defined in a periphery of the outer tube. Soldering is applied to the sleeve through the holes to firmly connect the outer tube and the sleeve together. A position of the GRIN lens relative to the optical fiber can be easily readjusted by re-soldering the sleeve.

19 Claims, 5 Drawing Sheets

OPTICAL COLLIMATOR AND METHOD FOR MAKING SAME

BACKGROUND OF THE INVENTION

1. Field of the Invention

The present invention is related to optical collimators and methods for making them, and more particularly to optical collimators assembled by means of gluing and welding.

2. Description of the Prior Art

An optical collimator with a Graded Index (GRIN) lens is used for collimating scattered light emitting from an output end of an optical fiber. The collimated light may then be efficiently and controllably utilized for transmission or testing.

As shown in FIG. 1, a conventional optical collimator 100 comprises an optical fiber 110, a ceramic ferrule 120, a GRIN lens 130 and an outer glass tube 140. The ferrule 120 has an inner end 122, an outer end 124, and a through hole 126 defined between the inner and outer ends 122, 124. A diameter of the through hole 126 is slightly greater than a diameter of the optical fiber 110. A cone-shaped opening (not labeled) is defined in the outer end 124, in communication with the through hole 126. The optical fiber 110 is typically sealed in the through hole 126 with UV-cured epoxy and 353-ND epoxy. To improve optical performance, the inner end 122 of the ferrule 120 and an inner end 112 of the optical fiber 110 are ground and polished to an oblique angle relative to an imaginary line that is perpendicular to respective longitudinal axes of the ferrule 120 and the optical fiber 110. The angle is typically between 6 and 8 degrees. The GRIN lens 130 has an inner end 132 and an outer end 134. The inner end 132 of the GRIN lens 130 is adjacent the inner end 122 of the ferrule 120, and is obliquely ground and polished to be parallel to the inner end 122. The longitudinal axis of the GRIN lens 130 is aligned with the longitudinal axis of the optical fiber 110. The ferrule 120 and the GRIN lens 130 are positioned and aligned in the glass tube 140, so that output light from the GRIN lens 130 can be accurately focused on the inner end 112 of the optical fiber 110. The ferrule 120 and the GRIN lens 130 are then fixed in place in the glass tube 140 with UV-cured epoxy and 353-ND epoxy.

When the optical fiber 110 is epoxied to the ferrule 120, and when the GRIN lens 130 and the ferrule 120 are epoxied to the glass tube 140, excess epoxy may contaminate the inner ends 112, 132 of the optical fiber 110 and GRIN lens 130. Such contamination reduces the output of the optical fiber 110, and diminishes the performance of the GRIN lens 130. The optical collimator 100 is prone to have large insertion loss. In addition, such contamination is difficult to remove. Furthermore, it is difficult to readjust the relative positions of the optical fiber 110 and the GRIN lens 130 after they have been secured in position. Moreover, typical epoxies need baking to be cured. These epoxies have a coefficient of thermal expansion several times larger than that of the GRIN lens 130. During baking of the epoxy, the accurate relative positions of the optical fiber 110 and the GRIN lens 130 are frequently altered. Accurate focusing of light from the GRIN lens 130 to the optical fiber 110 is accordingly diminished.

An improved optical collimator is needed to overcome the above-described numerous disadvantages of conventional optical collimators.

SUMMARY OF THE INVENTION

Accordingly, an object of the present invention is to provide an inexpensive optical collimator having low insertion loss.

Another object of the present invention is to provide an optical collimator free from contamination caused by excess glue.

A further object of the present invention is to provide an optical collimator which allows easy and precise adjustment of components thereof.

To solve the problems of the prior art and achieve the objects set out above, an optical collimator of the present invention comprises an optical fiber, a ferrule, a GRIN lens, a metal sleeve and an outer metal tube. The optical fiber has an exposed end which is inserted into the ferrule and glued thereinto. The GRIN lens is glued into the sleeve. Opposite ends of the GRIN lens protrude from opposite ends of the sleeve. The outer tube includes first and second receiving portions. The ferrule is glued into the first receiving portion, and the sleeve is secured in the second receiving portion. A plurality of soldering holes is defined in a periphery of the outer tube. Solder is applied to the sleeve through the holes to firmly connect the outer tube and the sleeve together. After assembly, if a position of the GRIN lens relative to the optical fiber is found to be inaccurate, the sleeve can be easily readjusted and re-soldered.

Other objects, advantages and novel features of the present invention will be apparent from the following detailed description of a preferred embodiment thereof with reference to the attached drawings, in which:

DETAILED DESCRIPTION OF THE PREFERRED EMBODIMENT

Figure 1:
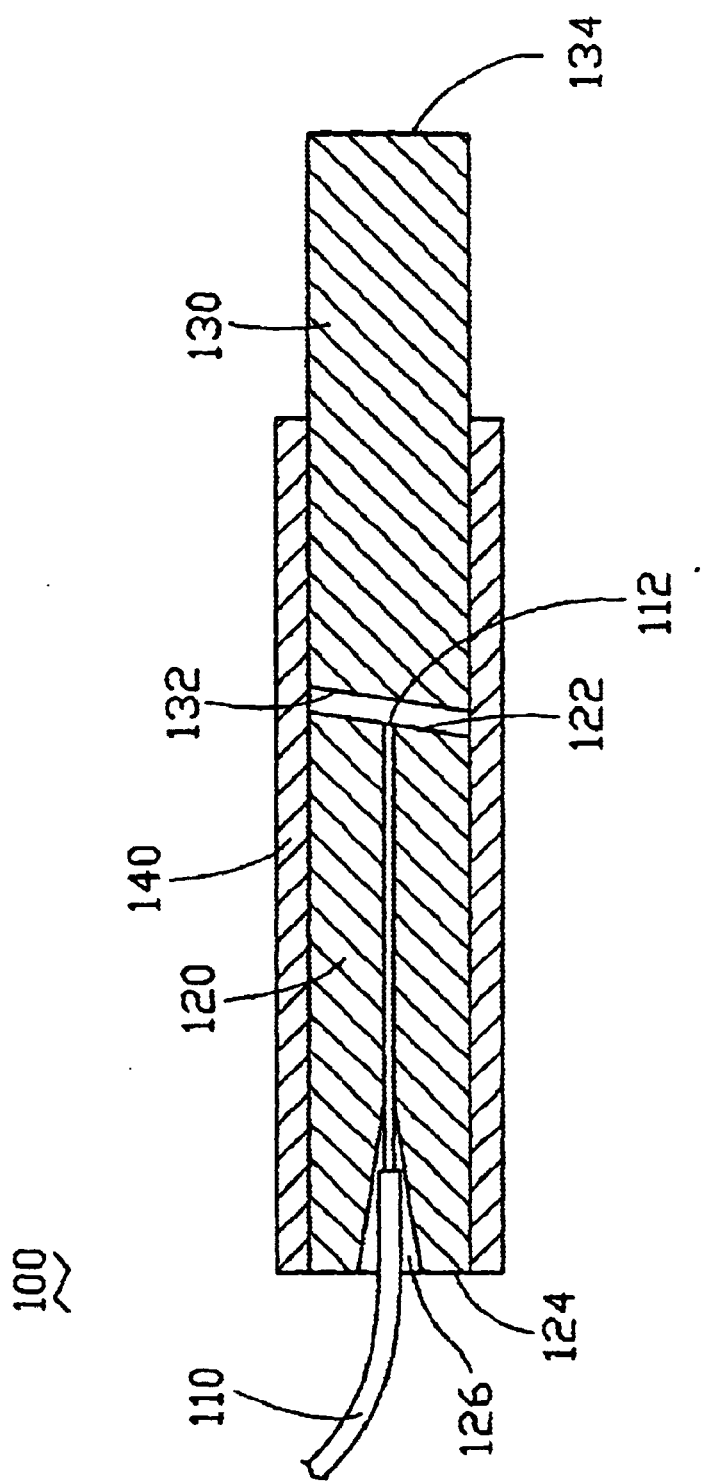
FIG. 1 is a schematic cross-sectional view of a conventional optical collimator.

Reference will now be made to the drawing figures to describe the present invention in detail.

Figure 2:
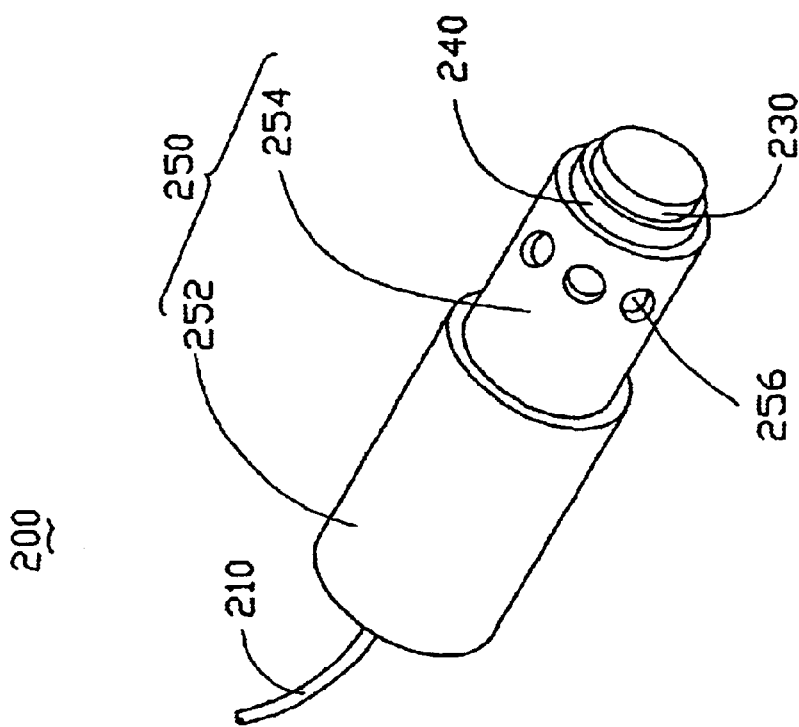
FIG. 2 is a perspective view of an optical collimator in accordance with the present invention.
Figure 3:
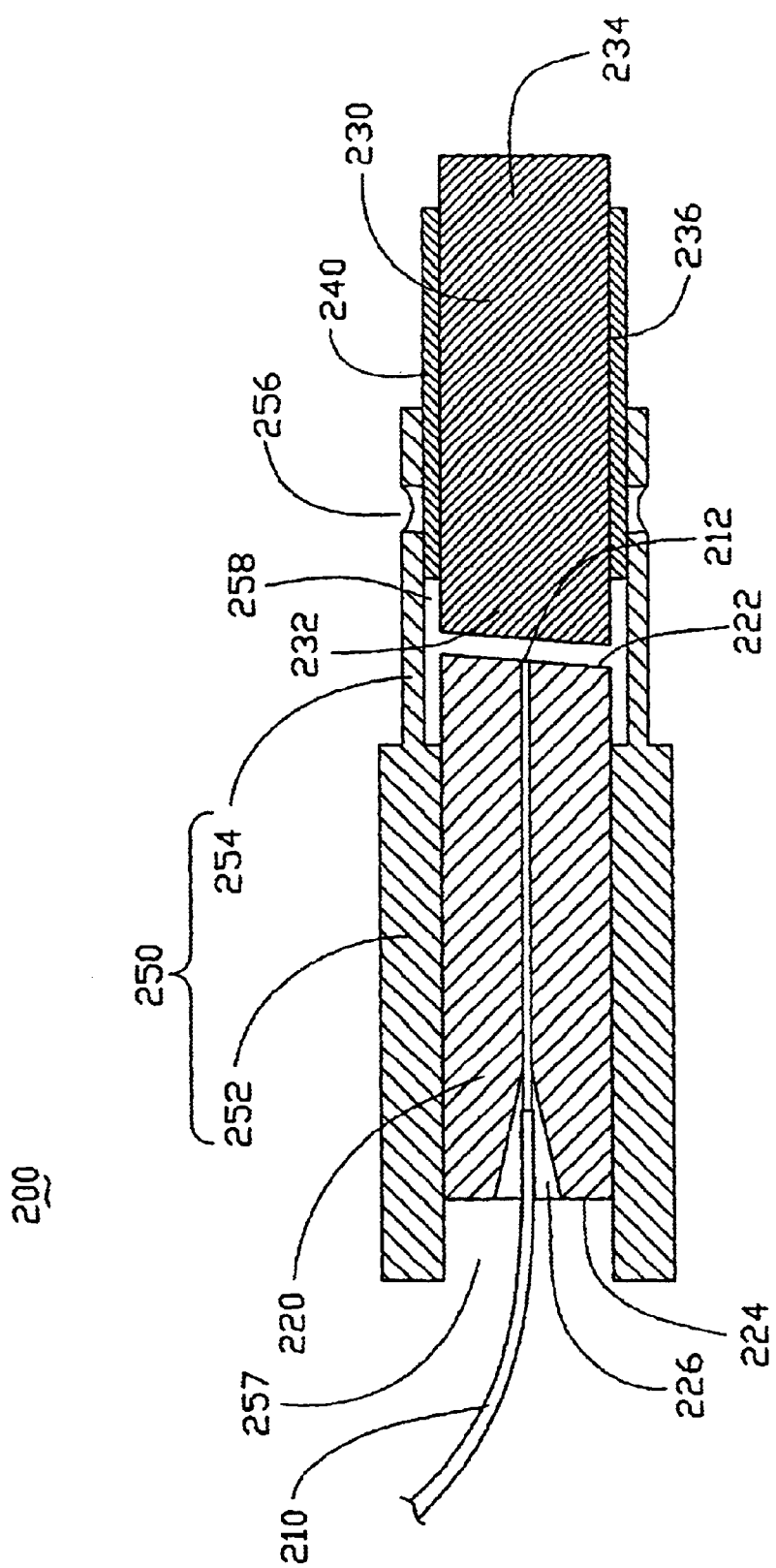
FIG. 3 is a schematic cross-sectional view of the optical collimator of FIG. 2.

Referring to FIGS. 2 and 3, an optical collimator 200 in accordance with the present invention comprises an optical fiber 210, a ferrule 220, a Graded Index (GRIN) lens 230, a sleeve 240 and an outer tube 250.

The ferrule 220 has an inner end 222, an outer end 224, and a through hole 226 defined between the inner and outer ends 222, 224. A diameter of the through hole 226 is slightly greater than a diameter of the optical fiber 210. A conical opening (not labeled) is defined in the outer end 224, in communication with the through hole 226. The optical fiber 210 is preferably sealed in the through hole 226 with UV-cured epoxy and 353-ND epoxy. To improve optical performance, the inner end 222 of the ferrule 220 and an inner end 212 of the optical fiber 110 are ground and polished to an oblique angle relative to an imaginary line that is perpendicular to respective longitudinal axes of the ferrule 220 and the optical fiber 210. The angle is preferably between 6 and 8 degrees.

The GRIN lens 230 is cylindrical, and includes a cylindrical outer surface 236, a first end 232 and a second end 234. The first end 232 of the GRIN lens 230 is adjacent the inner end 222 of the ferrule 220, and terminates at a first end face (not labeled). The first end face is obliquely ground and polished so that it forms an oblique angle with an imaginary line that is perpendicular to a longitudinal axis of the GRIN lens 230. The angle is preferably between 6 and 8 degrees. The second end 234 has a second end face (not labeled) perpendicular to the longitudinal axis of the GRIN lens 230. A pitch of the GRIN lens 230 is equal to or slightly less than one-quarter pitch, so that light passing through the GRIN lens 230 can be focused at a point on the inner end 212 of the optical fiber 210.

In the preferred embodiment, the sleeve 240 is made of Covar alloy or another suitable metal which has a coefficient of thermal expansion similar to that of the ferrule 220 and the GRIN lens 230. The sleeve 240 is cylindrical, and defines a cylindrical cavity (not labeled) therein.

The outer tube 250 is made from a same material used for making the sleeve 240, and has a first receiving portion 252 and a second receiving portion 254. The first and second receiving portions 252, 254 are cylindrical. An outer diameter of the second receiving portion 254 is greater than an outer diameter of the first receiving portion 252. The first and second receiving portions 252, 254 respectively define first and second cylindrical cavities 257, 258 therein. A diameter of the first cylindrical cavity 257 is less than a diameter of the second cylindrical cavity 258. The diameter of the first cylindrical cavity 257 is slightly greater than a diameter of the ferrule 220. The diameter of the second cylindrical cavity 258 is slightly greater than a diameter of the sleeve 240. Accordingly, a distance of insertion of the sleeve 240 into the second receiving portion 254 can be easily adjusted. Furthermore, an orientation of a longitudinal axis of the sleeve 240 relative to a longitudinal axis of the second receiving portion 254 can be easily adjusted. The inner end 222 of the ferrule 220 protrudes into the second cylindrical cavity 258 of the second receiving portion 254. The combined GRIN lens 230 and sleeve 240 is securely positioned in the second cylindrical cavity 258 of the second receiving portion 254. A plurality of soldering holes 256 is defined in a periphery of the second receiving portion 254.

Figure 4:
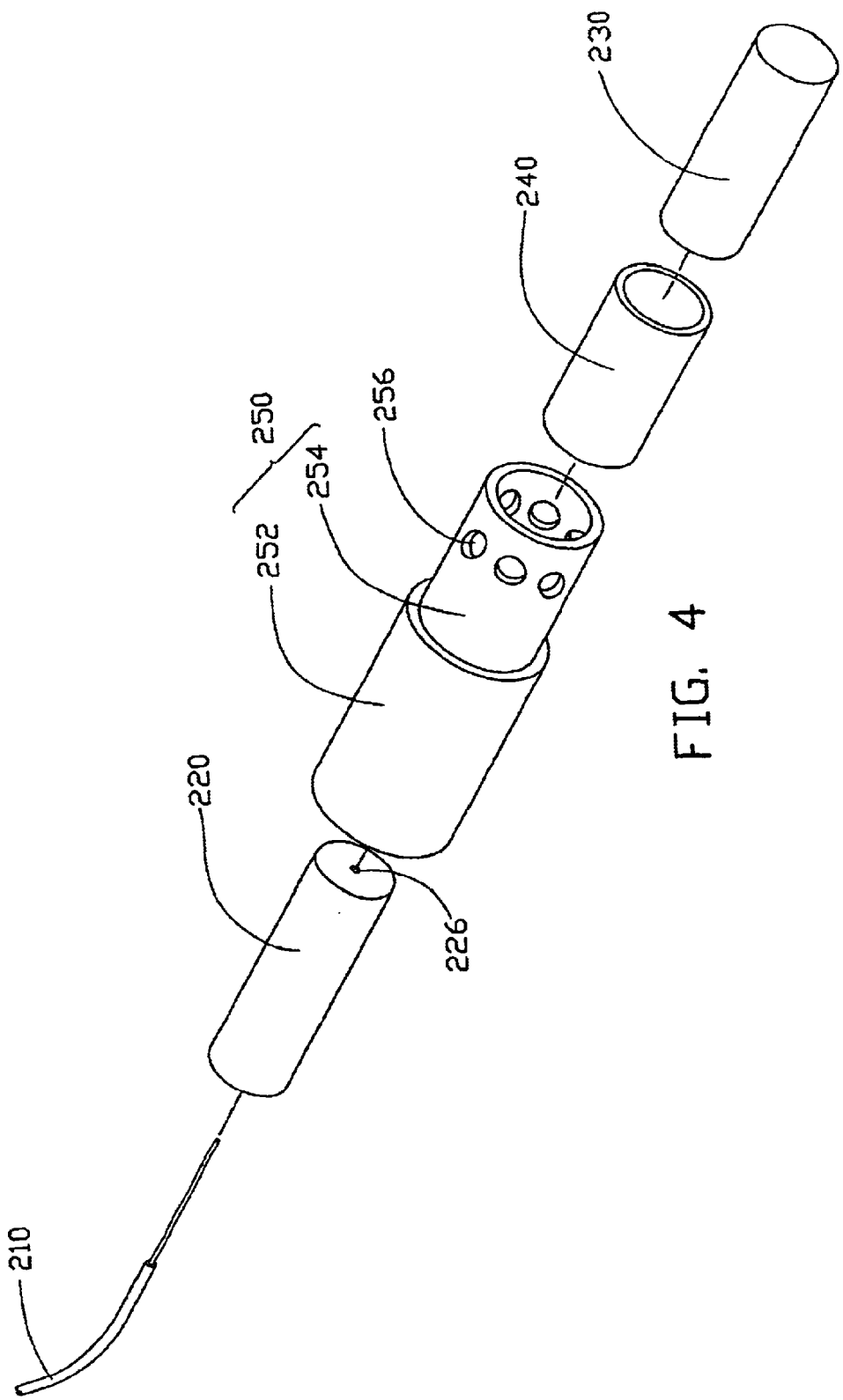
FIG. 4 is an exploded view of the optical collimator of FIG. 2.
Figure 5:
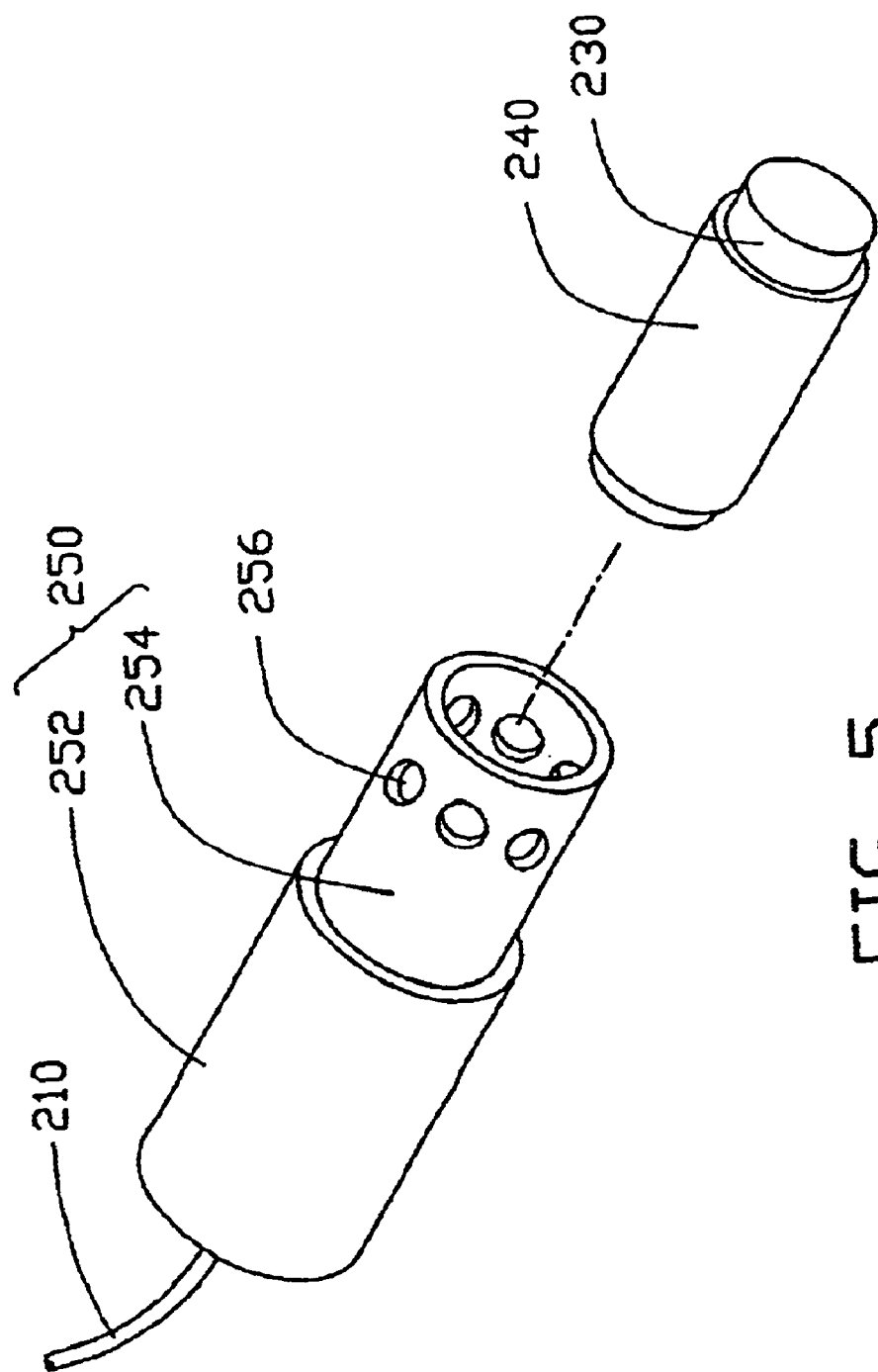
FIG. 5 is a partly assembled view of FIG. 4.

Referring also to FIGS. 4 and 5, in assembly, a cladding (not labeled) of an end portion of the optical fiber 210 is removed to leave an exposed end (not labeled) of the optical fiber 210. The exposed end is uniformly coated with epoxy film. The epoxy is preferably UV-cured epoxy or 353-ND epoxy. The optical fiber 210 is inserted into the through hole 226 of the ferrule 220 via the conical opening. The combined ferrule 220 and optical fiber 210 is baked to cure the epoxy. A contact portion (not labeled) of the ferrule 220 is uniformly coated with epoxy film. The epoxy is preferably UV-cured epoxy or 353-ND epoxy. The combined ferrule 220 and optical fiber 210 is inserted into the first cylindrical cavity 257 of the first receiving portion 252. The inner end 222 of the ferrule 220 protrudes into the second cylindrical cavity 258 of the second receiving portion 254. The combined outer tube 250 and ferrule 220 is baked to cure the epoxy film.

A contact portion (not labeled) of the cylindrical outer surface 236 of the GRIN lens 230 is uniformly coated with epoxy film. The epoxy is preferably UV-cured epoxy or 353-ND epoxy. The GRIN lens 230 is inserted into the sleeve 240. The first end 232 of the GRIN lens 230 protrudes from an inner end of the sleeve 240. The second end 234 of the GRIN lens 230 protrudes from an outer end of the sleeve 240. The combined sleeve 240 and GRIN lens 230 is baked to cure the epoxy film, and then inserted into the second cylindrical cavity 258 of the second receiving portion 254. A position of the sleeve 240 is precisely adjusted to attain optimal optical positioning of the GRIN lens 230 relative to the inner end 212 of the optical fiber 210. A gap (not labeled) is thereby defined between the sleeve 240 and the ferrule 220. In the preferred embodiment, soldering is applied to the sleeve 240 and the second receiving portion 254 through the holes 256, to firmly connect the sleeve 240 and the outer tube 250 together. Other welding means such as laser welding may alternatively be used to fasten the sleeve 240 and the outer tube 250 together. The collimating device 200 is thus formed.

The optical collimator 200 completely eliminates the problem of excess glue contaminating end faces of the GRIN lens 230. Accordingly, insertion loss of the collimating device 200 is minimized. In addition, precise alignment and positioning of the GRIN lens 230 relative to the optical fiber 210 is obtained by adjusting the position of the sleeve 240 and then welding the sleeve 240 in the outer tube 250. Therefore, precise alignment and positioning of the GRIN lens 230 relative to the optical fiber 210 can be easily attained. If after assembly the position of the GRIN lens 230 relative to the optical fiber 210 is found to be inaccurate, the problem can be easily corrected by re-welding. Furthermore, using a minimal amount of epoxy limits the amount of any thermal strain that may result from baking. Relatively small thermal strain seldom affects optical characteristics of the collimating device 200.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the first receiving portion 252 can be made with an inner sleeve having the similar diameter with the sleeve 240 and an outer sleeve having the similar diameter with the second receiving portion 254 wherein the such an inner sleeve and such an outer sleeve are fastened to each other.

What claimed is:

1. An optical collimator comprising:
an optical fiber having an exposed end;
a ferrule receiving the exposed end of the optical fiber and sealing the optical fiber;
a Graded Index lens;
a metallic sleeve securing the Graded Index lens therein; and
a metallic outer tube comprising a first receiving portion and a second receiving portion, wherein the first receiving portion has a small inner diameter than the second receiving portion, and the ferrule is received in the first receiving portion; the sleeve is secured in the second receiving portion by way of welding.

2. The optical collimator as described in claim 1, wherein the second receiving portion further comprises at least one hole in a periphery thereof, and the sleeve is soldered within the second receiving portion at the at least one hole.

3. The optical collimator as described in claim 1, wherein the ferrule is secured in the first receiving portion with glue.

4. The optical collimator as described in claim 1, wherein the sleeve is secured in the second receiving portion with laser welding.

5. The optical collimator as described in claim 1, wherein a metal forming the sleeve has a coefficient of thermal expansion which is similar to that of glass.

6. The optical collimator as described in claim 5, wherein a metal forming the outer tube is the same as the metal forming the sleeve.

7. The optical collimator as described in claim 1, wherein opposite ends of the GRIN lens protrude from opposite ends of the sleeve.

8. The optical collimator as described in claim 1, wherein a part of the ferrule protrudes into the second receiving portion of the outer tube.

9. The optical collimator as described in claim 1, wherein the Graded Index lens has an inner end protruding from the sleeve, and said inner end is ground and polished to an angle between 6 and 8 degrees relative to a line that is perpendicular to a longitudinal axis of the Graded Index lens.

10. The optical collimator as described in claim 1, wherein the ferrule has an inner end adjacent the Graded Index lens, and said inner end defines an angle between 6 and 8 degrees relative to a line that is perpendicular to a longitudinal axis of the ferrule.

11. The optical collimator as described in claim 1, wherein each of the ferrule and the Graded Index lens has an outer end, and each of the outer ends are ground and polished to be perpendicular to respective longitudinal axes of the ferrule and of the Graded Index lens.

12. The optical collimator as described in claim 1, wherein a gap is defined between the Graded Index lens and the ferrule.

13. A method for forming an optical collimator, the method comprising the steps of:

preparing an optical fiber having a cladding of an end thereof removed thereby leaving an exposed end of the optical fiber;

preparing a ferrule, coating the exposed end of the optical fiber with glue, inserting the exposed end of the optical fiber into the ferrule, and baking the combined ferrule and optical fiber to cure the glue;

preparing an outer tube having a first receiving portion and a second receiving portion, having a greater inner diameter than the first receiving portion, coating the ferrule with glue, inserting the ferrule into the first receiving portion, and baking the combined outer tube and ferrule to cure the glue;

preparing a metal sleeve and a Graded Index lens, coating the Graded Index lens with glue, inserting the Graded Index lens into the sleeve, and baking the combined sleeve and Graded Index lens to cure the glue;

inserting the sleeve into the second receiving portion of the outer tube, and adjusting a position of the sleeve to obtain optimal optical positioning of the Graded Index lens relative to the optical fiber; and welding the sleeve to the outer tube.

14. The method as described in claim 13, wherein the second receiving portion further comprises at least one hole defined in a periphery thereof, and the sleeve is welded within the second receiving portion through the at least one hole.

15. The method as described in claim 13, wherein the sleeve is welded within the second receiving portion of the outer tube by soldering.

16. The method as described in claim 13, wherein the sleeve is welded within the second receiving portion of the outer tube by laser welding.

17. The method as described in claim 13, wherein opposite ends of the GRIN lens protrude from opposite ends of the sleeve.

18. The method as described in claim 13, wherein a part of the ferrule protrudes into the second receiving portion of the outer tube.

19. An optical collimator comprising:

an optical fiber having an exposed end;

a ferrule receiving the exposed end of the optical fiber;

a GRIN lens spaced from said ferrule in an axial direction;

a sleeve receiving said GRIN lens with an inner end of the GRIN lens axially extending beyond said sleeve; and an outer tube defining a first receiving portion and a second receiving portion along said axial direction; wherein the first receiving portion retainably and intimately egageably receives the ferrule with an inner end of said ferrule extends beyond said first receiving portion toward the GRIN lens, and the second receiving portion retainably and intimately engageably receives the sleeve.

* * * * *